US009415532B2

(12) United States Patent
Cain et al.

(10) Patent No.: US 9,415,532 B2
(45) Date of Patent: Aug. 16, 2016

(54) MOLDING AND OVERMOLDING COMPOSITIONS FOR ELECTRONIC DEVICES

(71) Applicant: Henkel IP & Holding GmbH, Duesseldorf (DE)

(72) Inventors: Cynthia L. Cain, Flemington, NJ (US); Charles W. Paul, Madison, NJ (US); Maria Cristina Barbosa DeJesus, Basking Ridge, NJ (US)

(73) Assignee: HENKEL IP HOLDING GMBH, Duesseldorf (DE)

( * ) Notice: Subject to any disclaimer, the term of this patent is extended or adjusted under 35 U.S.C. 154(b) by 0 days.

(21) Appl. No.: 14/816,809

(22) Filed: Aug. 3, 2015

(65) Prior Publication Data

US 2016/0031134 A1    Feb. 4, 2016

Related U.S. Application Data

(62) Division of application No. 13/804,811, filed on Mar. 14, 2013, now Pat. No. 9,127,153.

(60) Provisional application No. 61/721,756, filed on Nov. 2, 2012.

(51) Int. Cl.

| B29C 45/14 | (2006.01) |
|---|---|
| C08L 53/00 | (2006.01) |
| B32B 27/30 | (2006.01) |
| B29C 33/12 | (2006.01) |
| B29C 45/00 | (2006.01) |
| B29K 33/04 | (2006.01) |
| B29L 31/34 | (2006.01) |
| B29K 33/00 | (2006.01) |

(52) U.S. Cl.
CPC ............. *B29C 45/14* (2013.01); *B29C 33/12* (2013.01); *B29C 45/0001* (2013.01); *B29C 45/14065* (2013.01); *B29C 45/14639* (2013.01); *B32B 27/308* (2013.01); *C08L 53/00* (2013.01); *B29K 2033/04* (2013.01); *B29K 2033/08* (2013.01); *B29K 2033/12* (2013.01); *B29L 2031/34* (2013.01); *Y10T 428/23* (2015.01)

(58) Field of Classification Search
None
See application file for complete search history.

(56) References Cited

U.S. PATENT DOCUMENTS

| 4,233,432 | A | | 11/1980 | Curtis, Jr. | |
|---|---|---|---|---|---|
| 5,171,628 | A | | 12/1992 | Arvedson et al. | |
| 5,256,717 | A | | 10/1993 | Stauffer et al. | |
| 5,331,033 | A | | 7/1994 | Stauffer et al. | |
| 5,397,843 | A | | 3/1995 | Lakshmanan et al. | |
| 5,403,658 | A | | 4/1995 | Southwick et al. | |
| 5,679,762 | A | | 10/1997 | Yoshida et al. | |
| 5,776,406 | A | * | 7/1998 | Schubert | B29C 45/0001 264/328.1 |
| 6,734,256 | B1 | | 5/2004 | Everaerts et al. | |
| 6,833,404 | B2 | | 12/2004 | Quinn et al. | |
| 6,881,805 | B2 | | 4/2005 | Dar et al. | |
| 6,894,114 | B2 | | 5/2005 | Kato et al. | |
| 7,084,209 | B2 | | 8/2006 | Everaerts et al. | |
| 7,307,115 | B2 | | 12/2007 | Husemann et al. | |
| 7,714,052 | B2 | | 5/2010 | Paul et al. | |
| 2009/0124730 | A1 | | 5/2009 | Matsuda et al. | |
| 2011/0133245 | A1 | | 6/2011 | Zhou et al. | |
| 2012/0259050 | A1 | | 10/2012 | Vitrano et al. | |

FOREIGN PATENT DOCUMENTS

| EP | 0349270 B1 | 8/1994 |
|---|---|---|
| EP | 2345698 A1 | 7/2011 |
| JP | 11302617 A | 11/1999 |
| RU | 2419634 C2 | 5/2001 |
| RU | 2433152 C2 | 11/2012 |
| WO | 9709393 A1 | 3/1997 |
| WO | 2009054553 A2 | 4/2009 |
| WO | 2010138221 A1 | 12/2010 |

OTHER PUBLICATIONS

Mancinelli, Paul A. "Advancements in Acrylic HMPSA's via Block Copolymer Technology," Materiaux et Techniques, Mar.-Apr. 1990, pp. 41-46.
Eastotac Hydrocarbon Resins Brochure by the Eastman Company (Aug. 1992).
Specialty Polymers for Adhesives and Sealants by the Exxon Chemical Company (Oct. 1990).
Litz, R.J., Developments in Ethylene-Based Hot Melt Adhesives, Adhesives Age 17(8):35-38 (1974).
Clark, T., Bookbinding with Adhesives (3rd ed. McGraw-Hill, UK 1994), p. 1.
Alger, Mark S.M., Polymer Science Dictionary (Elsevier Applied Science, New York 1989), p. 115.
Lee, S.M., Dictionary of Composite Materials Technology (Technomic Publishing Company, Inc., 1989) p. 43.
Young, R.J. & Lovell, P.A., Introduction to Polymers (2nd ed., Chapman & Hall, New York 1991), pp. 10-11, 292.
Handbook of Adhesives (ed. Irving Skeist, Van Nostrand Reinhold Co. 1977), pp. 495-498.
Kraus et al., Tack and Viscoelasticity of Block Copolymer Based Adhesives, J. Adhesion 10:221-36 (1979).
Eastman Chemical Brochure titled "World of Eastman Chemicals" dated Jan. 1989, Publication No. P-160F.
Eastman AQ Branched Polyesters Brochure dated Sep. 1997, Publication No. WA-62B.
Eastman Chemical Sales Brochure dated Feb. 1993, Publication No. WA-21.
Exxon Chemical Sales Brochure dated Mar. 1994.
Eastman Chemical Eastotac Hydrocarbon Resins dated Nov. 1994, Publication WA-3C.
Exxon Chemical Escorez Tackifiers Brochure dated Apr. 1992.

\* cited by examiner

*Primary Examiner* — Jeffrey Mullis
(74) *Attorney, Agent, or Firm* — Sun Hee Lehmann

(57) ABSTRACT

The present invention relates to molding and overmolding compositions for delicate components. More particularly the invention relates to compositions for low pressure molding and overmolding, making these compositions particularly well suited for electronic devices. The molding and overmolding composition is suitable for low pressure injection molding processes, particularly at 0.5 to 200 bars at 70° C. to 240° C.

3 Claims, No Drawings

MOLDING AND OVERMOLDING COMPOSITIONS FOR ELECTRONIC DEVICES

CROSS-REFERENCE TO RELATED APPLICATIONS

The application is a divisional of U.S. patent application Ser. No. 13/804,811 filed Mar. 14, 2013, which claims the benefit of U.S. Provisional Patent Application No. 61/721,756 filed Nov. 2, 2012, the contents of both of which are incorporated herein by reference.

FIELD OF THE INVENTION

The present invention relates to molding and overmolding compositions for electronic devices. More particularly the invention relates to compositions for low pressure molding and overmolding, making these compositions particularly well suited for using with electronic devices.

BACKGROUND OF THE INVENTION

Molding is a manufacturing process for producing a shaped article by liquefying a plastic or metal material into a mold cavity and cooling and hardening the material to the configuration of the cavity. In overmolding, a previously molded part can be reinserted to a new mold to allow a new molded layer to form around the previously molded part, and becomes integral to the new article. Overmolding can join two different components together without the use of any adhesives or primers. This combination of two different components allows for the creation of strong, structural products with ergonomic comfort and appeasing display.

Typical injection molding requires the pressure to be greater than 200 bar at 250° C. or above because the molding materials have high viscosity and high softening temperature. While robust components are suitable for injection molding with higher pressure, delicate components are unable to withstand the high pressure and high temperature. An alternative to the typical injection molding process is a low-pressure injection molding. The two processes are virtually identical except that the low-pressure injection molding requires 0.5 to 200 bars at 70° C. to 240° C. for the injection.

Illumination or electronic devices contain fragile components and hence, low-pressure injection molding is preferred over the traditional high pressure injection molding. The electronic device comprises components such as LEDs (light emitting diodes), connectors, sensors, capacitors, micro switches, printed circuit boards, cable bundles, transponders, and the like. LEDs are semiconductor diodes that consume little energy (e.g., a voltage of less than 5 volts or a current of less than 20 milliamps), yet emit light with a brightness exceeding that of a much larger incandescent bulb. A LED, whether a lamp type or a surface mount device (SMD) type, typically comprises a LED chip that is encapsulated by an optically clear and thermally stable material into a device for proper wiring, mounting and functioning.

Various LED molding and overmolding materials exist. WO 2010138221 describes two part liquid molding systems of urethanes, silicones, and acrylics. While performances are acceptable for the two part liquid systems, the liquid form normally leads to use of special techniques such as potting or casting to make a silicone body as well as extended curing times (e.g. more than several hours to days) leading to lower productivity. The extended curing times may, in turn, lead to lack of surface uniformity especially with thicker molds and translate to low optical quality in resulting LEDs.

Epoxy resins are also widely utilized as molding and overmolding composition. However, epoxy resins tend to exhibit poor light stability in that they yellow over time following exposure to ultraviolet (UV) light or to elevated thermal conditions (e.g. a temperature in excess of (>) 110 deg. C. for a time >1000 hours). Yellowing, in turn, leads to a reduction in light output from a LED over time. Moreover, curing often occurs over an extended period of time (e.g. three hours) in order to minimize residual stress within an aliquot of cured epoxy resin. "Residual Stress" refers to a tension or compression that exists in a bulk material without application of an external load such as an applied force or displacement of thermal gradient. As residual stress within LED material increases, adverse effects such as dimensional changes or cracking tend to occur over a LED's lifetime usage.

Polyamides are widely utilized in low pressure injection molding due to their low viscosity. While well-suited as a molding and overmolding material, polyamides are typically amber in color, which is undesirable for optical applications.

U.S. Publication No. 2011/0133245 teaches hydrogenated styrene/butadiene triblock polymer composition for LED encapsulant and overmolding applications; however, the viscosity of the composition is too high for low pressure injection molding processes.

W02009545553A2 teaches that acrylic block copolymers have exceptional clarity, low color and stability which may be useful for optical applications. U.S. Pat. No. 6,894,114 to Kato further teaches that acrylic block copolymers may be used for molding articles; however the materials are limited to traditional high pressure injection molding processes.

More often, acrylic block copolymers are combined with tackifiers as pressure sensitive materials. Pressure sensitive materials exhibit "aggressive and permanent tack" or tack at activation temperature (heat-activatable), and have a modulus value of less than $3 \times 10^6$ dyne/cm$^2$ at ambient temperature. U.S. Pat. No. 6,734,256 to Everaerts et al., teaches the use of acrylic block and high amounts of tackifier (>28.5%) in order to obtain a hot melt processable adhesive such as pressure-sensitive adhesive (PSA) or heat activatable adhesive composition. Furthermore, U.S. Pat. No. 7,084,209 to Everaerts et al., teaches the use of acrylic block copolymers with high amounts of tackifier for pressure sensitive adhesive tapes.

There is a need in the art for non-tacky molding and overmolding compositions for low pressure injection molding that possess fast throughput and clarity without damaging the delicate electrical or electronic components of the article to be overmolded. The current invention fulfills this need.

BRIEF SUMMARY OF THE INVENTION

The invention relates to a composition suitable for use as a low pressure molding or overmolding material in preparing electronic devices as well as resulting molded and overmolded devices.

One aspect of the invention is directed to an overmolding composition comprising: (1) an [A]-[B]-[A] copolymer, wherein [A] is a hard-block monomer with a Tg greater than about 30° C. and [B] is a soft-block monomer with a Tg less than about 20° C., and the copolymer comprises greater than 35 wt % of the [A] monomer and (2) a tackifying resin. The overmolding composition has a viscosity less than 75,000 cP at 210° C. measured in accordance with ASTM D3236 and a modulus greater than $1 \times 10^7$ dyne/cm$^2$ at 25° C.

Another aspect of the invention is directed to an article of manufacture comprising an electronic component and an overmolding composition. The overmolding composition comprises (1) an [A]-[B]-[A] copolymer, wherein [A] is a hard-block monomer with a Tg greater than about 30° C. and [B] is a soft-block monomer with a Tg less than about 20° C., and the copolymer comprises greater than 35 wt % of the [A] monomer, (2) a tackifying resin, and (3) about 0.05 to about 5 wt % of a UV absorber selected from the group consisting of benzotriazoles, triazines and benzophenones. The overmolding composition has a softening point greater than 135° C. measured in accordance with ASTM D6090.

Yet another aspect of the invention is directed to a method for forming an overmold over an electronic component, which comprises (a) preparing an overmolding composition comprising an [A]-[B]-[A] copolymer, wherein [A] is a hard-block monomer with a Tg greater than about 30° C. and [B] is a soft-block monomer with a Tg less than about 20° C., and the copolymer comprises greater than 35 wt % of the [A] monomer, a tackifying resin, and 0.05 to about 5 wt % of a UV absorber selected from the group consisting of benzotriazoles, triazines and benzophenones; (b) applying the overmolding composition on the electronic component at a pressure less than 150 bars; and (c) cooling the overmolding composition.

DETAILED DESCRIPTION OF THE INVENTION

All documents cited herein are incorporated in their entireties by reference.

The weight percent (wt %) is based on the total weight of the composition, unless stated otherwise.

The terms "molding" and "overmolding" are interchangeably used to denote single or multi-material molding.

This invention relates to a composition suitable for overmolding delicate components, preferably electronic components, more preferably electronic components that require high transparency.

The overmolding composition comprises (1) an [A]-[B]-[A] copolymer, wherein [A] is a hard-block monomer with a Tg greater than about 30° C. and [B] is a soft-block monomer with a Tg less than about 20° C., and the copolymer comprises greater than 35 wt % of the [A] monomer; and (2) a tackifying resin. The overmolding compositions of the invention exhibit unique features that make them useful for low pressure molding for electronic components. Features such as high transmission, low color, UV stability and thermal cycling resistance make the molding and overmolding composition well suited for illumination or electronic devices that contain fragile components.

In one embodiment, the block copolymer component is present at levels of at or greater than 50% by weight of the overmolding composition.

Acrylic polymer, as used herein, is intended to include those polymers that contain at least one acrylic or methacrylic acid alkyl ester monomer. Block copolymers that may be used in the practice of the invention will generally be multiblock polymers wherein greater than about 35 weight % of the polymer comprise at least 2 hard blocks. Examples of useful block copolymers include those of the formula -A-B-A- and (-A-B-)$_n$-Xm. Particularly preferred are block copolymers of the formula -[A1]-[B]-[A2]-. In the above representative formulations, A, A1 and A2 each represent a polymer block having a glass transition temperature (Tg) of greater than about 30° C., preferably greater than 80° C., most preferably greater than 110° C., as determined by differential scanning calorimetry (DSC), B represents a polymer block having a Tg of less than about 20° C., preferably less than 0° C., most preferably less than −20° C. as determined by DSC, and X represents a multifunctional coupling agent such as silicon tetrachloride, dibromoethane and tris(nonyl phenyl) phosphite.

The Tg of the acrylic blocks can be determined by differential scanning calorimetry (DSC) conducted at a heating rate of 20° C./minute with 5 mg or smaller samples. The Tg is calculated as the midpoint between the onset and endpoint of heat flow change corresponding to the glass transition on the DSC heat capacity heating curve. The use of DSC to determine Tg is well known in the art, and is described by B. Cassel and M. P. DiVito in "Use of DSC To Obtain Accurate Thermodynamic and Kinetic Data", American Laboratory, January 1994, pp 14-19, and by B. Wunderlich in Thermal Analysis, Academic Press, Inc., 1990.

Suitable A1 and A2 polymer blocks include polymers or copolymers derived from acrylic or methacrylic acid alkyl ester monomers such as methyl methacrylate, ethyl methacrylate, n-propyl methacrylate, isobutyl methacrylate, isobornyl acrylate, isobornyl methacrylate, isobutyl methacrylate, t-butyl methacrylate, cyclohexyl methacrylate and combinations thereof. Preferred A1 and A2 polymer blocks are methyl methacrylate, ethyl methacrylate, isobornyl acrylate, isobornyl methacrylate, cyclohexyl methacrylate and combinations thereof.

Suitable B polymer blocks include polymers or copolymers derived from acrylic or methacrylic acid alkyl ester monomers such as methyl acrylate, ethyl acrylate, n-propyl acrylate, isobutyl acrylate, n-butyl acrylate, n-propyl acrylate, sec-butyl acrylate, t-butyl acrylate, amyl acrylate, isoamyl acrylate, n-hexyl acrylate, 2-ethylhexyl acrylate, lauryl acrylate, iso-octyl acrylate, decyl methylacrylate and combinations thereof. Preferred B polymer blocks are n-butyl acrylate, 2-ethylhexyl acrylate, iso-octyl acrylate and combinations thereof.

It is understood that the same acrylic monomers may be included in both the hard and soft blocks, and that one or more other copolymerizable monomers may be used in the preparation of the polymeric blocks. Copolymerizable monomers include but are not limited to, acrylic acid, methacrylic acid, vinyl esters, vinyl ethers, styrene monomers, and acrylamides and methacrylamides. Other comonomers may be present in amounts of up to about 25% of each block, preferably less than 10%, provided they do not interrupt the clean phase separation between the hard and soft blocks upon cooling.

The [A] monomer is present in greater than about 35% of the polymer, preferably greater than 45%, by weight.

In a particularly preferred embodiment, A1 and A2 are methyl methacrylate and B is n-butyl acrylate. Suitable block copolymers can be purchased from Kuraray under the trade designation KURARITY™. One exemplary block copolymer is LA4285 triblock copolymer with poly(methyl methacrylate) endblocks and a poly(n-butyl acrylate) midblock. Other block copolymers such as LA2250, LA2140e and LA2330 triblock copolymers with poly(methyl methacrylate) endblocks and a poly(n-butyl acrylate) midblock may be added to modify the properties and processing conditions of the composition.

The molecular weight of the acrylic block copolymer is not specifically restricted, but from the viewpoint of moldability into the optical component of the invention, the weight-average molecular weight of the copolymer in terms of polystyrene, as determined by gel permeation chromatography (GPC) measurement, is in the range of preferably 10,000 to 500,000 Da, more preferably 20,000 to 300,000 Da.

Methods of preparing acrylic block copolymers are known in the art. Block copolymers for use in the practice of the invention may be made by anionic polymerization as described in Japanese Kokai 11-302617, by free radical polymerization as described by P. Mancinelli, Materiaux et Techniques, March-April 1990, pp. 41-46, by polyfunctional chain transfer agents such as described by in U.S. Pat. No. 5,679,762, by iniferter polymerization as described in EP 0 349 270 B1 and/or by free radical retrograde precipitation, as described in copending commonly assigned U.S. application Ser. No. 10/045,881. Particularly preferred are acrylic block copolymers prepared by anionic polymerization.

The overmolding composition further comprises a tackifying resin. Tackifying resins are present in at least about 10 wt %, preferably at least about 15%, and more preferably at least about 20 wt %, based on the total composition.

Typical tackifier has a Ring and Ball softening points, as determined by ASTM method E28, of about 70° C. to about 150° C.

Useful tackifying resins may include any compatible resin or mixtures thereof such as natural and modified rosins including, for example, as gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene; polyterpene resins having a softening point, as determined by ASTM method E28-58T, of from about 70° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof.

In one embodiment, the tackifiers are synthetic hydrocarbon resins. Included are aliphatic or cycloaliphatic hydrocarbons, aromatic hydrocarbons, aromatically modified aliphatic or cycloaliphatic hydrocarbons and mixtures thereof. Non-limiting examples include aliphatic olefin derived resins.

Also useful are aromatic hydrocarbon resins that are C9 aromatic/aliphatic olefin-derived and available from both Sartomer and Cray Valley have same trade name Norsolene and from the Rutgers series of TK aromatic hydrocarbon resins.

Alpha methyl styrene such as Kristalex 3085 and 3100 from Eastman Chemical, Sylvares SA 100 from Arizona Chemical are also useful as tackifiers in the invention.

Mixtures of two or more described tackifying resins may be required for some overmolding compositions.

Exemplary tackifying resins in the inventive overmolding composition include α-methyl styrene, rosin ester, disproportionated and/or hydrogenated rosin ester, styrenated terpene, terpene phenol, aliphatic-modified aromatic resin and mixtures thereof.

In another embodiment, the overmolding composition further comprises a low molecular weight, end-block tackifier. Low molecular weight is to denote an average molecular weight range less than 20,000 Da. End block tackifiers are those that reinforce hard, A block phase, rather than soft, B block phase. Suitable end-block tackifiers include acrylate based end block tackifying resins. One particularly preferred end block tackifying resin is a poly(methyl methacrylate) resin with a molecular weight less than 20,000 Da.

The overmolding composition may further comprise from about 0.05 to about 5 wt % of a UV absorber. The UV absorbers are benzotriazoles, triazines, benzophenones, cyanoacrylates, oxanilides and the like. Examples of such UV absorbers include Tinuvin 328, Tinuvin 329, Tinuvin 384-2, Tinuvin 400, Tinuvin 479, Tinuvin 900, Tinuvin 928, Tinuvin 1130 and others from BASF under the Tinuvin and Chimassorb tradenames and from Mayzo under the BLS tradename.

In one preferred embodiment, the benzotriazole is a hydroxyphenyl benzotriazole with a structure of

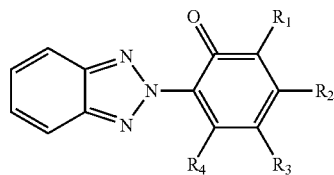

wherein R1, R2, R4=H, aliphatic, cycloaliphatic or aromatic with C1-C20 and wherein, R3 is not H. In one preferred embodiment, R3 is an aliphatic, cycloaliphatic or aromatic with C1-C20.

Overmolding compositions comprising the above UV absorbers have long term UV stability and high transparency over time. In some embodiments, the UV stability and color (b value) is less than 8, preferably less than 5, even after UV aging for at least 3000 hours measured in accordance with ASTM G154.

In another embodiment, the overmolding composition further comprises about 0.05 to about 5 wt % of a hindered amine light stabilizer. Exemplary hindered amine light stabilizers are Tinuvin 152, Tinuvin 292, Tinuvin 622, Tinuvin 770 and Tinuvin 783 available from BASF and BLS 1944 and BLS 123 available from Mayzo.

An antioxidant or stabilizer may also be included in the overmolding compositions described herein in amounts of up to about 3% by weight, more typically in amounts of about 0.5%. Among the stabilizers or antioxidants useful herein are the hindered phenols or hindered phenols in combination with a secondary antioxidant such as distearyl thiodipropionate ("DSTDP") or dilauryl thio-dipropionate ("DLTDP"). Representative antioxidants include: 1,3,5-trimethyl 2,4,6-tris(3,5-di-tert-butyl-4-hydroxybenzyl)benzene; pentaerythrityl tetrakis-3(3,5-di-tert-butyl-4-hydroxyphenyl)propionate; pentaerythritol tetrakis(3-Iauryl thiodipropionate); n-octadecyl-3,5-di-tert-butyl-4-hydroxyphenolypropionate; 4,4'-methylenebis(2,6-tert-butylphenol); 4,4'-thiobis(6-tert-butyl-o-cresol); 2,6-di-tertbutylphenol; 6-(4-hydroxyphenoxy)-2,4-bis(n-octyl-4-thio)-1,3,5-triazine; di-n-octadecyl 3,5-di-tert-butyl-4-hydroxy-benzyl-phosphonate; 2-(n-octylthio)ethyl 3,5-di-tert-butyl-4-hydroxy-benzoate; and sorbitol hexa[3-(3,5-di-tert-butyl-4-hydroxyphenyl)-propionate]. Preferred are IRGAFOS 168, a secondary antioxidant available from BASF and IRGANOX 1010, a hindered phenol primary antioxidant available from BASF. Other antioxidants include ETHANOX 330, a hindered phenol from Albermarle; SANTOVAR A, a 2,5 ditert-amyl hydroquinone from Monsanto; and NAUGARD P a tris(p-nonylphenyl)phosphite from Chemtura.

Other additives conventionally used in overmolding compositions to satisfy different properties and meet specific application requirements also may be added. Such additives include, for example, wax, plasticizer, fillers, pigments, flow modifiers, dyestuffs, mold release agents or antistatic agents which may be incorporated in minor or larger amounts into the adhesive formulation, depending on the purpose.

Exertion of large pressure with delicate electronic components can damage components. The inventive overmolding composition has a viscosity lower than 75,000 cP at 210° C., as measured by ASTM D3236. In another embodiment, the overmolding composition has a viscosity lower than 50,000 cP at 210° C. Due to the low viscosity at 210° C., the inventive overmolding composition can be used in low pressure molding processes.

Examples of molding methods to produce articles comprising delicate electronic component of the invention include melt extrusion, melt injection molding and solution casting.

The overmolding material is melted and injected into a closed mold or hollow part with the electronic component. After cooling the overmolding composition, the electronic component is removed out of the mold with the overmolding composition. Electronic components include connectors, sensors, capacitors, micro switches, LEDs, printed circuit boards, cable bundles and transponders. Higher pressures and high temperatures are not suitable for the electronic components. Low pressure overmolding is conducted at 0.5 to 200 bars at 70° C. to 240° C. The inventive overmolding composition can undergo low pressure overmolding, preferably at less than 200 bars at 240° C., more preferably at less than 150 bars, 120 bars, 60 bars at 210° C. Moreover, the overmolding composition, while useful for low pressure overmolding has high heat stability. In fact, the overmolding composition has a softening point greater than about 135° C., preferably greater than about 140° C.

In one embodiment, the overmolding composition is well suited for electronic components that comprise an optical component. The overmolding composition has high light transmission, preferably greater than 85%, more preferably greater than 90% in accordance with ASTM D1003. The initial color (b value) measured in accordance with BYK Spectro-guide and Hunter L, A, b, Color Scale, as described by Hunter Lab, is less than 6, preferably less than 4. The overmolding composition maintains its optical clarity and color even after aging for at least 3000 hours.

While a certain amount of tackifier is utilized in the inventive overmolding composition, the overmolding composition is non-tacky at room temperature. Even with tackifying resin amounts greater than 10 wt %, and greater than 20 wt %, the modulus of the overmolding composition is greater than $1\times10^7$ dyne/cm$^2$, and no finger tack is observed.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

EXAMPLES

The overmolding mixtures may be produced by those skilled in the art via twin-screw extruder or other mixing or extrusion equipment capable of processing block copolymers. For the overmolding examples listed here, a Brabender (sigma-blade mixer) was utilized. All of the components were loaded in the Brabender and mixed at 180° C. until homogeneous. Depending on the residence time in the mixer, the initial color of the samples may vary. Optimal color is achieved by minimizing residence time, such as by using an extruder at temperatures in the range of 210° C.

Viscosity was measured with a Brookfield viscometer and Thermosel heating chamber with spindle #27 at 210° C.

The softening point was measured with a Mettler Toledo FP83HT Dropping Point instrument. The samples were heated at a rate of 1.7° C./min (approximately 3° F./min).

The tackiness was measured at ambient temperature, 23-25° C., by finger touch. If the overmolding material was tacky to the finger, it was deemed to be "yes."

The rheology measurements were conducted with a Rheometric Scientific RDA-III controlled strain rheometer with a frequency of 10 rad/sec and parallel plates (8 mm) with a 2 mm gap. The storage modulus (G') at 25° C. is reported.

To measure the transmission, b value and UV aging tests, the overmolding composition was formed into a 2 mm thick plaque with a brass template and a Carver laboratory press. Samples were pressed at 200° C. between Kapton® film to minimize defects on the surface from moisture or air bubbles, or contamination with silicone.

Transmission was measured at 550 nm for a 2 mm thick molded sample. Transmission was measured via a Perkin Elmer Lambda 35 UV/Vis Spectrophotometer with a 2 nm slit and 240 nm/min scan speed. A Labsphere RSA-PE-20 reflectance sphere accessory was used. The transmission values are a direct correlation to the clarity/transparency of the overmolding composition.

Color was measured with a BYK Spectro-guide. The b value, on the CIE L*a*b color scale, was reported. A negative b value indicates the presence of blue color while a positive b value indicates the presence of yellow color. A value closer to zero indicates less color.

UV aging was conducted in a QUV Accelerated Weathering Tester using UVA-340 bulbs (typical irradiance of 0.68 W/m$^2$, Q-Lab). Transmission and color results were measured after 20 weeks (approximately 3360 hours) of UV aging.

Examples of block copolymers with greater than 40% MMA and tackifiers are shown in Table 1.

TABLE 1

|  | Example 1 | Example 2 | Example 3 | Example 4 |
|---|---|---|---|---|
| MMA-nBA-MMA* ($M_w$ 65,000 50% MMA) (LA4285, Kuraray) | 60 | 55 | 63 | 63 |
| α-methyl styrene tackifier; 85° C. softening point (Kristalex 3085, Eastman Chemical) | 39 | 44 | 34.5 | 34.5 |
| antioxidant | 1.0 | 1.0 | 1.0 | 1.0 |
| hydroxyphenyl benzotriazole (Tinuvin 328, BASF) |  |  |  | 1.0 |
| hydroxyphenyl benzotriazole (Tinuvin 928, BASF) |  |  | 1.0 |  |

TABLE 1-continued

|  | Example 1 | Example 2 | Example 3 | Example 4 |
|---|---|---|---|---|
| hindered amine light stabilizer (Tinuvin 622, BASF) |  |  |  | 0.5 |
| hindered amine light stabilizer (Tinuvin 292, BASF) |  |  | 0.5 |  |
| Viscosity at 210° C. (cP) | 21680 | 13250 | 38750 | 41680 |
| Softening Point (° C.) | 158 | 148 | 170 | 170 |
| Tackiness (23-25° C.) | No | No | No | No |
| G' at 25° C. (×10^8 dyne/cm$^2$) | 4.49 | 8.20 | 3.17 | 6.60 |
| Transmission (initial) at 550 nm (%) |  |  | 92 | 89 |
| Transmission at 550 nm, after 20 weeks UV aging (%) |  |  | 91 | 86 |
| b value (initial) |  |  | 4.1 | 4.2 |
| b value, after 20 weeks UV aging |  |  | 6.0 | 4.6 |

*methyl methacrylate-n-butyl acrylate-methyl methacrylate block copolymer

It is expected that the initial transmission and initial b values of Examples 1 and 2 are substantially similar to Examples 3 and 4.

Despite having greater than 30 wt % of tackifiers in the composition, the overmolding Examples 1-4 were not tacky, had viscosities less than 75,000 cP at 210° C., had modulus values of greater than 10^7, had softening points greater than 135° C., high transmission/transparency, and low color (b value).

The addition of a UV absorber, hydroxyphenyl benzotriazole, and a hindered amine light stabilizer to the overmolding composition resulted in high transmission/transparency and low color (b value) even after 20 weeks of accelerated UV aging.

Table 2 lists comparative examples. The samples were made as described above, and the tests were conducted in the same manner as described in Table 1.

Comparative example 1 utilized a block copolymer with MMA content less than 35 wt %. The resultant overmolding composition was tacky at room temperature, and had high viscosity and low modulus at 25° C. The addition of a tackifier in comparative example 1B lowered the viscosity; however, it remained tacky at room temperature.

The high viscosity of comparative example 2 is not suitable for low pressure injection molding.

Comparative example 3 had a softening temperature below 135° C. Softening temperature below 135° C. has low dimensional stability. It is preferable for the inventive overmolding composition to have a softening temperature at or greater than 135° C. while having low viscosity at 210° C.

Comparative example 4 corresponds to example 3 of EP 2 345 698, and comparative example 5 corresponds to example 5 of WO 2009/054553. Both samples are non-tacky, have high moduli and high softening temperature, however, the viscosity is too high for low pressure injection molding.

TABLE 2

|  | C Ex 1 | C Ex 1B | C Ex 2 | C Ex 3 | C Ex 4 | C Ex 5 | C Ex 6 |
|---|---|---|---|---|---|---|---|
| MMA-nBA-MMA*; M$_w$ 65,000; 50% MMA (LA4285, Kuraray) |  |  | 100 | 45 | 50 | 70 | 63 |
| MMA-nBA-MMA* M$_w$ 62,000; MMA 32% (LA2250, Kuraray) | 100 | 80 |  |  | 20 |  |  |
| Acrylic resin, MFR 15 g/10 min (230° C., 37.4 N) (Parapet GF, Kuraray) |  |  |  |  | 30 | 30 |  |
| α-methyl styrene tackifier; 850° C. softening point (Kristalex 3085, Eastman Chemical) |  | 20 |  | 54 |  |  | 34.5 |
| Antioxidant |  |  |  | 1.0 |  |  | 1.0 |
| Triazine (Tinuvin 1577, BASF) |  |  |  |  |  |  | 1.0 |
| hindered amine light stabilizer (Tinuvin 292, BASF) |  |  |  |  |  |  | 0.5 |
| Viscosity at 210° C. (cP) | >500,000 | 19300 | >500,000 | 4000 | >500,000 | >500,000 |  |
| Softening Point (° C.) | >230 |  | >230 (inferred) | 128 | >230 | >230 |  |
| Tackiness, (23-25° C.) | Yes | Yes | No | No | No | No |  |
| G' at 25° C. (×10^8 dyne/cm$^2$) | .0782 | 0.221 | 3.40 | 10.8 | 1.44 | 5.37 |  |
| Transmission (initial) at 550 nm (%) |  |  | 91 |  |  |  | Not available |
| Transmission at 550 nm, after 20 weeks UV aging (%) |  |  | 91 |  |  |  | 87.6, hazy |
| b value |  |  | 1.1 |  |  |  | 5.5 |
| b value, after 20 weeks UV aging |  |  | 1.3 (32 wks) |  |  |  | 7.3, hazy |

*methyl methacrylate-n-butyl acrylate-methyl methacrylate block copolymer

Not all UV absorbers are suitable for this invention. The addition of Tinuvin 1577 in comparative example 6 resulted in reduced initial transmission of the overmolding composition. UV aging this sample for 20 weeks resulted in haziness of the 2 mm thick sample, as well as increased color. Such samples would be unsuitable for optical devices.

We claim:

1. A method of forming an overmold over an electronic component comprising the steps of:
   (a) preparing an overmolding composition comprising:
      1) an [A]-[B]-[A] copolymer, wherein [A] is a hard-block monomer with a Tg greater than about 30° C. and [B] is a soft-block monomer with a Tg less than about 20° C., and the copolymer comprises greater than 35 wt % of the [A] monomer;
      2) a tackifying resin;
      3) about 0.05 to about 5 wt % of a UV absorber selected from the group consisting of benzotriazoles, triazines and benzophenones; and
   wherein the wt % is based on the total weight of the composition;
   (b) applying the overmolding composition on the electronic component at a pressure less than 150 bars; and
   (c) cooling the overmolding composition.

2. The method of claim 1, wherein the overmolding composition is applied with pressure less than 120 bars.

3. The method of claim 2, wherein the overmolding composition is applied with pressure less than 60 bars.

* * * * *